H. W. MORGAN.

Assignor to the MERIDEN CASKET TRIMMING COMPANY.

COFFIN HANDLE.

No. 10,856. Reissued Aug. 9, 1887.

Witnesses:

Edward G. Walker

L. B. Whitaker.

Inventor.

Hubert W. Morgan

By his attys

Whitaker & Prevost

N. PETERS, Photo-Lithographer, Washington, D. C.

UNITED STATES PATENT OFFICE.

HUBERT W. MORGAN, OF MERIDEN, CONNECTICUT, ASSIGNOR TO THE MERIDEN CASKET TRIMMING COMPANY, OF SAME PLACE.

COFFIN-HANDLE.

SPECIFICATION forming part of Reissued Letters Patent No. 10,856, dated August 9, 1887.

Original No. 364,724, dated June 14, 1887. Application for reissue filed July 16, 1887. Serial No. 244,553.

*To all whom it may concern:*

Be it known that I, HUBERT W. MORGAN, of Meriden, in the county of New Haven and State of Connecticut, have invented certain new and useful Improvements in Handles; and I do hereby declare the following to be a full, clear, and exact description of the invention, that will enable others skilled in the art to which it appertains to make and use the same.

The object of my invention is to produce casket handles and trimmings which are substantial and strong, and at the same time beautiful in appearance, closely resembling the finest and most highly-finished solid metal, and adapted by their peculiar construction to be beautifully ornamented, either in colors or mechanically, and yet made much more cheaply than if made of solid metal; and I accomplish this by the construction hereinafter described, and illustrated in the accompanying drawings, in which--

Figure 1:
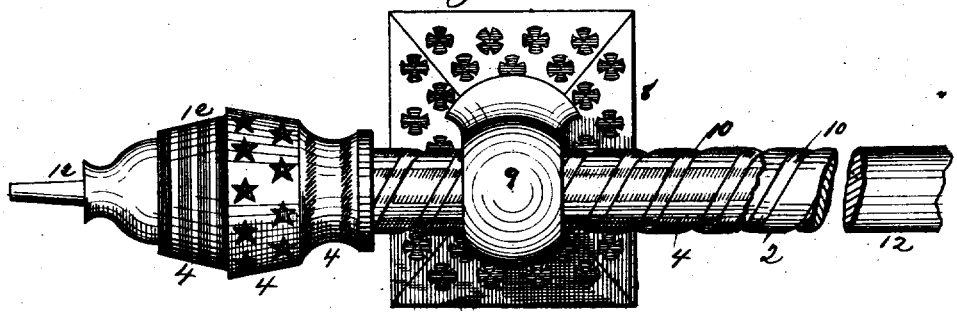
Figure 2:
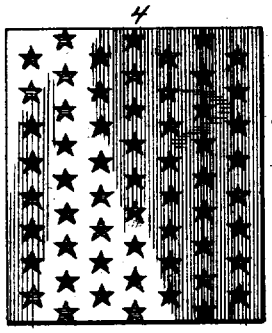
Figure 3:
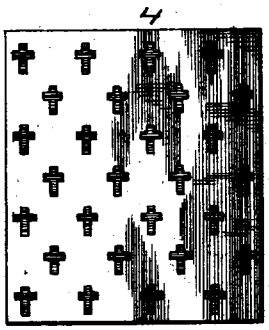
Figure 4:
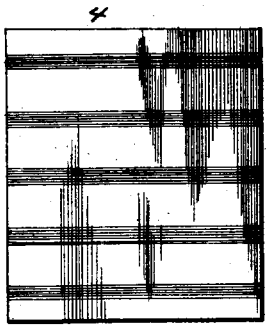

Figure 1 is a front view of one end of a casket-handle and trimmings constructed according to my invention, with a portion of its flexible metallic covering removed; and Figs. 2, 3, and 4 represent different pieces or sections of ornamented flexible metallic sheets, which I use in covering the body of the trimmings to give the latter the appearance of highly-finished metal.

In the drawings, 8 represents the ear, 9 the arm, and 2 the handle, which together constitute the ordinary casket-handle and its trimmings, and which, when they are secured in place to a casket, are used to carry the latter. The body of these I make of any desired rigid material—as, for example, the ear 8 and arm 9 may be of any ordinary base metal or alloy and cast, and the handle 2 may be made preferably of wood, and this handle, with its enlarged or ornamentally-shaped ends, may be made either all in one piece or in separate pieces, and secured together as may be desired or as is most convenient. When made of wood or other similar material, it may be turned with recesses, cavities, or protuberances—as, for example, a spiral, 10, either sunken in its exterior surface or raised thereon; or the whole surface of the body of the handle may be plain or smooth, with no devices either sunken or raised from its exterior surface, as may be desired. I then take metallic sheets, made very thin and flexible, and made preferably of an alloy similar to the ordinary tin or white-metal foil, and either having its exposed surface plain, as at 12, or ornamented with any desired stripes, figures, characters, or devices, as at 4, either burnished or printed in colors or enameled; and I apply any suitable adhesive substance, preferably in a liquid form, either to the back surface of the metallic sheets or to the exterior surface of the body of the parts, made as above described, pressing the metal-sheet covering firmly and closely thereto and into the cavities or upon the protuberances, when they are made. When this is done neatly, the handles or trimmings will have the exact appearance of being made of metal and electroplated, and either plain or more or less burnished, or having the exterior surface ornamented, or having sunken or raised ornamental devices thereon, and either in colors or otherwise. It is evident that this appearance of the handle or trimmings cannot be produced by making them of metal in the usual way, because the ornamental devices cannot be burnished upon or added to the exterior surface of the solid metal without great expense; and if the handle 2 is made or turned from wood the whole will be very light, and at the same time very strong and durable, and have all the appearance of solid metal, and yet be much more beautiful in appearance than when the body is made of metal, and the expense of manufacture be very greatly reduced. It is also evident that the body of said parts when having raised or sunken devices thereon could not be covered with paper of any description, as the paper could not be made to yield or stretch and conform to all the sharp lines and fine depressions of the raised or sunken devices, whereas the flexible metallic sheet will readily stretch and yield, and will perfectly adapt itself, when firmly pressed, to all the irregularities, whether raised or sunken, of the exterior surface of the body to which it is applied.

I am aware that it has been proposed to form a tube from sheet metal with its edges locked to form a joint, and to place a bar grooved to receive the joint within such tube and then draw the metal down by machinery upon the wood. This construction I do not claim.

Having thus described my invention, what I claim as new is—

1. An improved casket-handle having its body made of a hard rigid material whose exterior surface has a flexible sheet-metal covering secured thereto by an adhesive substance, substantially as described.

2. An improved casket-handle and its trimmings having the main body of such parts made of a hard rigid material whose exterior surface has a flexible sheet-metal covering secured thereto by an adhesive substance, substantially as described.

In testimony whereof I affix my signature in presence of two witnesses.

HUBERT W. MORGAN.

Witnesses:
CHAS. WM. MARVOE,
WILLIAM C. MUELLER.